United States Patent [19]

Enoki et al.

[11] Patent Number: 4,525,820

[45] Date of Patent: Jun. 25, 1985

[54] FUNCTION SELECTING METHOD AND SYSTEM FOR AN AUDIO/VIDEO RECORDING AND REPRODUCING SYSTEM

[75] Inventors: Takashi Enoki; Hiroaki Nakamura, both of Toyokawa; Fujio Nakashima, Aichi, all of Japan

[73] Assignee: Hitachi, Ltd., Tokyo, Japan

[21] Appl. No.: 245,512

[22] Filed: Mar. 19, 1981

[30] Foreign Application Priority Data

Mar. 19, 1980 [JP] Japan .................................. 55-33867

[51] Int. Cl.³ .......................... G11B 31/00; H04N 5/76
[52] U.S. Cl. ...................................... 369/2; 369/6;
381/81; 381/123; 358/335; 360/33.1
[58] Field of Search ................ 179/1 B, 1 SW, 1 VL,
179/2 A, 2.51, 6.07–6.1; 360/60–61; 369/2,
6–12, 24–33; 455/352–355; 340/310 A, 163,
825.03, 825.04, 825.15, 825.25, 825.5, 825.51;
381/80–81, 123

[56] References Cited

U.S. PATENT DOCUMENTS

| | | | |
|---|---|---|---|
| 1,927,260 | 9/1933 | Erbe | 369/24 |
| 3,646,278 | 2/1972 | Panizzi | 369/2 |
| 3,922,641 | 11/1975 | Gates, Jr. | 340/825.3 |

FOREIGN PATENT DOCUMENTS

| | | |
|---|---|---|
| 921299 | 3/1963 | United Kingdom . |
| 1150364 | 4/1969 | United Kingdom . |
| 1414279 | 11/1975 | United Kingdom . |
| 2013436 | 8/1979 | United Kingdom . |

*Primary Examiner*—Raymond F. Cardillo, Jr.
*Attorney, Agent, or Firm*—Antonelli, Terry & Wands

[57] ABSTRACT

An audio/video recording and reproducing system having a discrete function unit such as tape deck, record player or tuner connected thereto includes a function selection circuit and a function specifying switch disposed in a main unit, such as a pre/main amplifier, and a control line, such as remote control line, for connecting the main unit and the discrete unit. By virtue of the function selection circuit, the selection of a desired discrete function unit can be carried out at the main unit. However, in addition to this, the system includes an arrangement for permitting selection of a desired discrete function unit at the discrete function unit itself, and, when this is done, for controlling the function selection at the main unit to select the output of the discrete function unit.

7 Claims, 7 Drawing Figures

| RS FLIP-FLOP | | | |
|---|---|---|---|
| $\bar{S}$ | $\bar{R}$ | OUTPUT Q | OUTPUT $\bar{Q}$ |
| H | H | PREVIOUS STATE | PREVIOUS STATE |
| L | H | H | L |
| H | L | L | H |
| L | L | H | H |

| SCAN SIGNAL $D_1$ | LEVEL ON LINE 6c | OUTPUT OF NOT CIRCUIT 121a |
|---|---|---|
| H | H | H |
| H | L | H |
| L | H | H |
| L | L | L |

FIG. 6

FUNCTION SELECTING METHOD AND SYSTEM FOR AN AUDIO/VIDEO RECORDING AND REPRODUCING SYSTEM

The present invention generally relates to method and system for selecting a function for an audio/video recording and reproducing system, and more particularly to a function selecting system for selecting an operation function in a radio receiver, audio system or audio/video reproducing system which is combined with remotely controlled external equipment such as a tape recorder or a record player and which has a remote control circuit for remotely controlling such equipment.

An audio system such as an FM radio receiver or a stereophonic player system typically has a function selection circuit at an input terminal of an audio frequency amplifier for selecting a detected output of an FM radio station, a detected output of an AM radio station, a playback output of a tape recorder and a playback output of a record player. It is a recent trend that the equipment combined with the FM radio receiver or the stereophonic player, such as a record player or a tape recorder, can assume a playback mode or a stop mode in response to an externally supplied control signal so that it is remotely controlled. Accordingly, it is a recent trend that the FM radio receiver or the stereophonic player incorporates a remote control circuit and an exclusive line for remotely controlling the record player or the tape recorder.

In such a playback system having the remote control function, a function selection circuit of the FM radio receiver or the stereophonic playback system is set to an operation mode for the tape recorder or the record player so that a playback output of the tape recorder or the record player is amplified and then an operation control signal such as a play signal, a start signal or a stop signal is supplied to the record player or the tape recorder to start or stop the operation of the equipment. In such a control system, however, since the flow of the control signal is unidirectional, it is not possible to control the function selection circuit of the FM radio receiver or stereophonic playback system from the tape recorder or record player. As a result, where the tape recorder and the record player are installed remotely from the FM radio receiver and the stereophonic playback system which are manually controlled at a spot of the tape recorder or the record player, it is necessary for a listener to go to the spot of the tape recorder or the record player to select the function. This occurs when a plurality of audio sources are not assembled in one unit and it is inconvenient to operate.

It is an object of the present invention to provide a function selecting method and system which overcome the problems encountered in the prior art system and which can select a function of a control device of an audio/video system such as an FM radio receiver, a stereophonic playback system or a video playback system by a control from an external equipment such as a deck or player.

In accordance with a basic concept of the present invention, an audio/video system having at least one of a plurality of audio sources (program sources) combined in the form of discrete unit, includes means for generating a function specifying signal for each discrete source unit in a distributed fashion to a main unit having a function selecting control device or control panel so that the function of the system can be specified by the signal from the source unit. The main unit includes signal input means for the function specification to allow centralized selection control so that it is compatible with the signal inputs from the discrete units.

In accordance with one aspect of the present invention, the function selection circuit sends the function specifying signal from the external equipment to the control device through a remote control cord, which connects the control device with the external equipment, in order to select the function.

Preferred embodiments of the present invention will now be explained in detail with reference to the accompanying drawings, in which.

Figure 1:
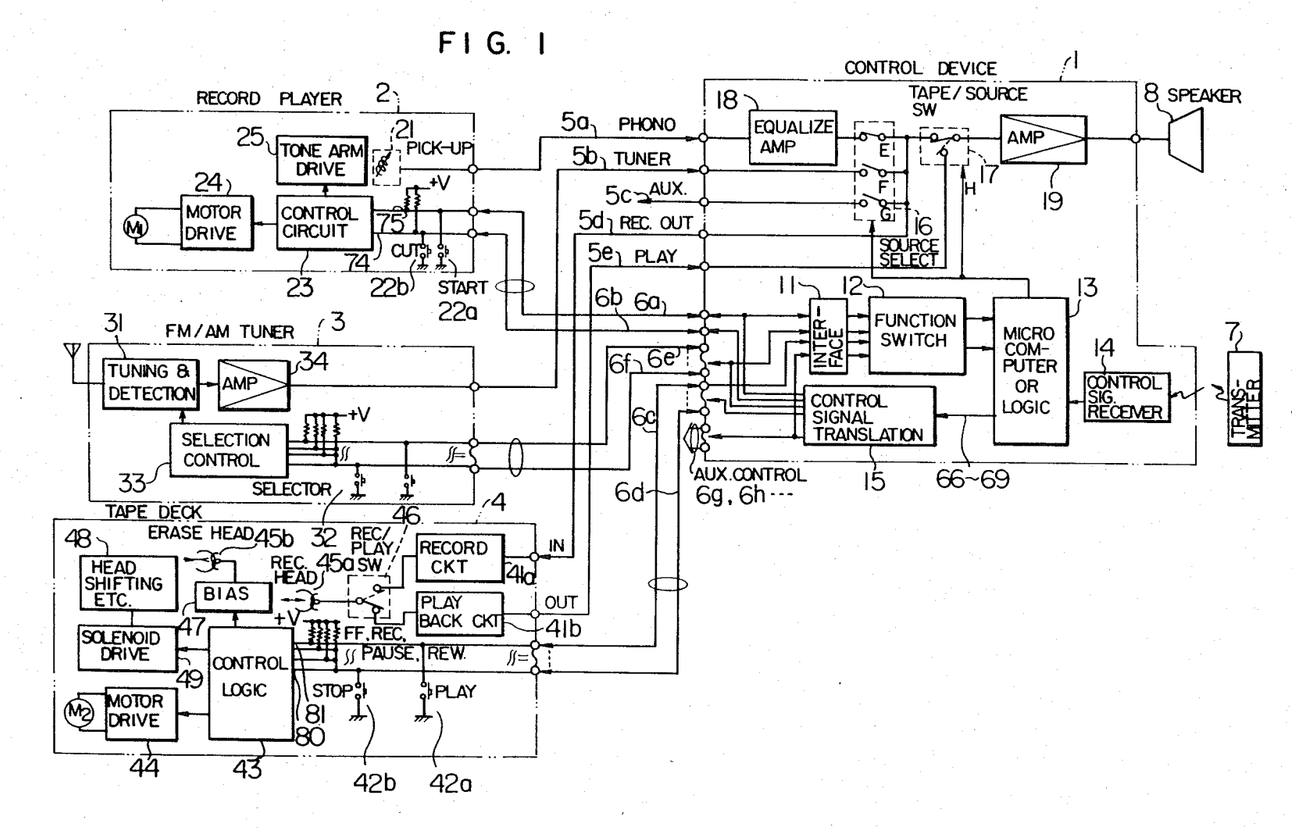
FIG. 1 shows a block diagram illustrating an embodiment of an audio recording and reproducing system which embodies the present invention.

Referring to FIG. 1, one embodiment of an audio recording and reproducing system to which the function selection system of the present invention is applied is explained.

In FIG. 1, the recording and reproducing system comprises a function selection control device 1 in a pre/main amplifier unit, and a record player unit 2, an FM/AM tuner unit 3 and a tape deck 4 located externally of the pre/main amplifier unit. The control device 1 and the external units are interconnected through audio signal lines 5a–5e and remote control lines 6a–6f. The control device 1 includes a receiver circuit 14 for the remote control signals, which receives control signals from a remote control transmitter 7 in the form of electromagnetic wave, infrared ray or ultrasonic wave. The control signals are used to select the function or control the operation of a selected external unit. The control device 1 includes an interface circuit 11, a function selection circuit 12, a microcomputer or logic circuit 13, a translation circuit 15 for translating signals from the circuit 13 to control signals for the player units 2, 3 and 4, an audio source selection circuit 16, an audio source/tape selection circuit 17, an equilizer amplifier 18 connected to an audio signal input terminal from the record player 2 and a power amplifier 19. The selection circuits 16 and 17 select signals in accordance with instructions from the circuit 13 and the selected signal from the audio source is converted to audio sound by a speaker 8. The function selection circuit 12 has function selection switches for the respective units, e.g. PHONO, TUNER, AUX, TAPE function switches so that the audio sources can be centrally selected at the pre/main amplifier.

The record player unit 2 includes a pick-up 21, a start button 22a, a cut button 22b, a playback control circuit 23, a drive circuit 24 for a turn table drive motor $M_1$ and a tone arm drive circuit 25. The control circuit 23 has a logic circuit which operates in response to control signals from the start and cut buttons 22a 22b and the control device 1.

The FM/AM tuner unit 3 comprises a tuning and detection circuit 31 for tuning and detecting a radio wave received by an antenna, station selection buttons 32a, 32b, ..., a station selection control circuit 33 and an amplifier 34 for the detected signal. The station selection operation can be carried out remotely from the unit 3 through the remote control lines 6e and 6f.

The tape deck unit 4 comprises a recording circuit 41a, a playback circuit 41b, a tape play button 42a, a stop button 42b, fast forward button 42c, a record button 42d, a pause button 42e, a rewind button 42f, a control logic circuit 43, a tape drive motor $M_2$, a motor drive circuit 44, a recording and reproducing head 45a, an erase head 45b, a record/playback selection switch circuit 46, a biasing circuit 47, a head shifting etc. 48 circuit for selecting head movement and tape transport direction, and a solenoid drive circuit 49.

The control device 1 further includes an AUX terminal 5c to receive an audio signal from other external units such as a television tuner, a VTR or a video disk player, and AUX. CONTROL terminals 6g, 6h, ..., for supplying the control signals from the control signal translator 15 to those external units.

Figure 2:
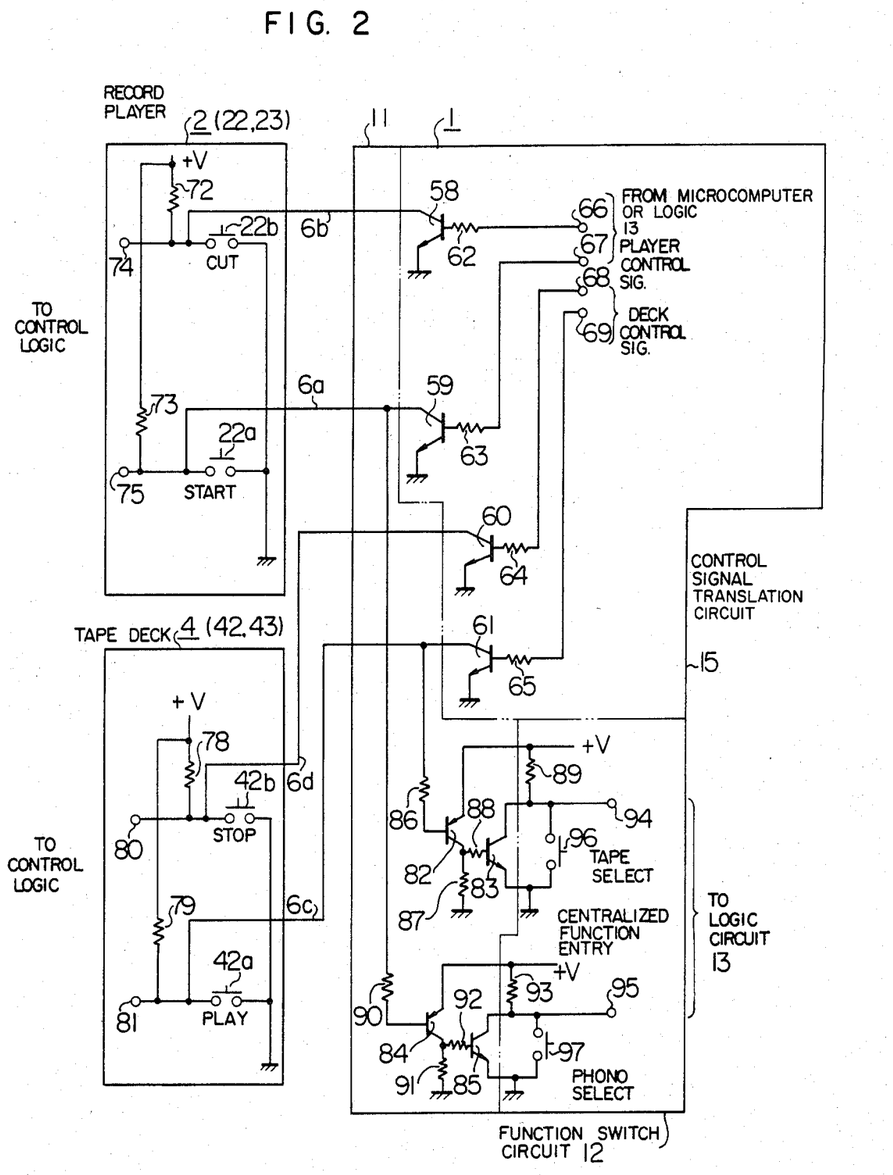
FIG. 2 shows a circuit diagram of a major portion of a function circuit in accordance with one embodiment of the present invention.

FIG. 2 shows an embodiment of a control signal generation and transmission circuit of the function selection circuit shown in FIG. 1. For the sake of simplicity, it is assumed that the record player 2 and the tape deck 4 are connected to the pre/main amplifier as the external units and those portions which are not directly related to the present invention are omitted in FIG. 2.

In FIG. 2, the control device 1 includes the interface circuit 11, the function switch circuit 12 and the operation control signal input circuit 15. The circuit 15 includes switching transistors 58-61. A collector of the first transistor 58 is connected to the line 6b while an emitter thereof is directly grounded. A base of the transistor 58 is connected to a control signal terminal 66 through a resistor 62. A collector of the second transistor 59 is connected to the line 6a, its base is connected to a control signal terminal 67 through a resistor 63 and its emitter is grounded. A collector of the third transistor 60 is connected to the line 6d, a base is connected to a control signal terminal 68 through a resistor 64 and an emitter is grounded. A collector of the fourth transistor 61 is connected to the line 6c, a base is connected to a control signal terminal 69 through a resistor 65 and an emitter is directly grounded. Signals transmitted from the remote control transmitter 7 are applied to the control signal terminals 66-69 after they have been received by the receiver 14 and processed by the microcomputer 13. The remote control signal processor may be a wireless remote control center HCC-8 marketed by Hitachi Ltd. or a modular-remote control Type SDT-900 marketed by Hitachi Ltd. The control signals may be applied to the terminals 66-69 by a presetting device in place of by the remote control.

The record player 2 has the cut switch 22b for stopping the playback of the record during the playback operation of the record player and restoring the pick-up arm to an arm rest, and the start switch 22a for allowing automatic playback of the record. One terminal of the switch 22b is connected to the line 6b and also connected to a power supply +V through a resistor 72 and to a terminal 74. One terminal of the switch 22a is connected to the line 6a and also connected to the power supply +V through a transistor 73 and to a terminal 75. The other terminals of the switches 22a and 22b are grounded.

The tape recorder or tape deck 4 has a stop switch 42b for stopping the recording or reproducing operation of the tape recorder and a play switch 42a for allowing the recording or reproducing operation. One terminal of the switch 42b is connected to the line 6d and also connected to the power supply +V through a resistor 78 and to a terminal 80 from which a stop input to the control logic 43 of the tape deck is supplied. One terminal of the switch 42a is connected to the line 6c and also connected to the power supply +V through a resistor 79 and to a terminal 81 from which a play input to the control logic 43 of the tape deck is supplied. The other terminals of the switches 42a and 42b are grounded.

The interface circuit 11 of the control device further includes four switching transistors 82, 83, 84 and 85. A base of the transistor 82 is connected to the line 6c through a resistor 86, a collector is connected to the power supply +V and an emitter is grounded through a resistor 87 and also connected to a base of the transistor 83 through a resistor 88. A collector of the transistor 83 is connected to the power supply +V through a resistor 89 and also connected to a terminal 94 and an emitter is grounded. A base of the transistor 84 is connected to the line 6a through a resistor 90 and a collector is connected to the power supply +V. An emitter of the transistor 84 is grounded through a resistor 91 and further connected to the base of the transistor 83 through a resistor 92. A collector of the transistor 85 is connected to the power supply +V through a resistor 93 and further connected to a terminal 95, and an emitter is grounded. Connected between the collector of the transistor 83 and ground is a tape function switch 96 for selecting the tape deck 4, and connected between the collector of the transistor 85 and ground is a phono function switch 97 for selecting the record player 2. The function switches 96 and 97 in the pre/main amplifier may have start instruction function when necessary. In such a case the outputs of the switches may be applied to the control terminals 67 and 69.

In the device shown in FIG. 2, applied to the control terminal 68 is the control instruction signal supplied from the remote control device when the operation of the tape recorder is to be stopped, and applied to the control terminal 69 is the control instruction signal when the tape recorder is to be operated. Under this condition, the base of the transistor 61 is at high (H) level and the transistor 61 turns on. Applied to the control terminal 66 is the control instruction signal when the playback of the record player is to be stopped, and applied to the control terminal 67 is the control instruction signal supplied from the function logic 13 or the input terminal of the remote controller when the playback of the record is to be started, in order to activate a start logic. Connected to the output terminals 80 and 81 of the tape recorder 4 is a logic circuit (not shown) for controlling the operation of the tape recorder. The logic circuit reads in the low (L) level signals appearing at the output terminals 80 and 81 and processes those signals. The operation control logic circuit may be a conventional one, e.g. Hitachi Type D85S which contains a microcomputer or Hitachi one-chip LSI Type HA 12001. Connected to the output terminals 74 and 75 of the record player 2 is a logic circuit (not shown), e.g. a Hitachi microcomputer HT860, for controlling the operation of the record player. This logic circuit operates when low level signals appear at the output terminals 74 and 75. Connected to the output terminals 94 and 95 of the function switch circuit 12 is the logic circuit 13 (FIG. 3) for controlling the function selection circuits 16 and 17. It operates when low level signals appear at the output terminals 94 and 95. When the low level signal appears at the output terminal 95, the function selection circuits 16 and 17 are controlled to select the output signal of the record player, and when the low level signal appears at the output terminal 94, they are controlled to select the output signal of the tape recorder.

In this system, when the tape recorder 4 and the record player 2 are to be controlled from the control device 1, a positive control signal is applied to a selected one of the control terminals 66–69 and a selected one of the two function switches 96 and 97 which corresponds to a function mode desired by an operator is closed to control the function selection circuits 16 and 17. For example, if the tape recorder is to be operated and the output signal therefrom is to be reproduced, the function switch 96 is closed. As a result, the output terminal 94 which has been at high level because the power supply +V has been fed through the resistor 89 now assumes the ground level or low level by the closure of the switch 96 and the logic circuit connected thereto is activated to control the function selection circuits 16 and 17 to select the output signal of the tape recorder. Thereafter, a positive control signal is applied to the control terminal 69 so that the transistor 61 turns on and the collector potential thereof falls. This potential is supplied to the tape recorder 4 through the line 6c. The output terminal 81 is rendered to low level to activate the logic circuit 43 of the tape recorder connected thereto so that the tape recorder assumes the playback mode.

When the function selection circuits 16 and 17 of the control device 1 are to select the unit 4 or 2 or the function of its own under the control from the tape recorder 4 or the record player 2, the play switch 42a or the start switch 22a is closed. For example, when the record player 2 is manually operated to play back the record, the start switch 22a which complementarily functions to the switch 22b is closed. As a result, the potential at the output terminal 75 which has been at the power supply +V voltage or high level through the resistor 73 now assumes the ground level (low level) through the switch 22a so that the logic circuit 23 connected thereto is activated. The potential at the terminal 75 is supplied to the base of the transistor 84 via the line 6a so that the transistor 84 turns on. As the transistor 84 conducts, the collector potential thereof rises to render the transistor 85 conductive and the collector potential thereof falls. This is equivalent to the closure of the function switch 97 so that the potential at the terminal 95 falls to activate the function logic circuit 13 connected thereto. In this manner, the function selection circuits 16 and 17 are controlled to select the output signal of the record player.

Figure 3:
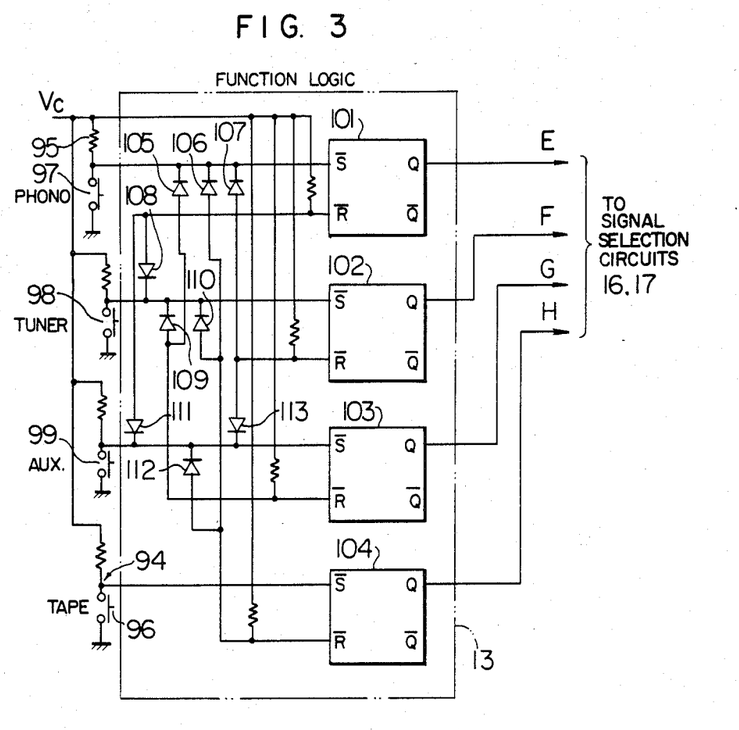
FIG. 3 shows a diagram of a function logic circuit used in the present invention.

FIG. 3 shows an embodiment of the function logic circuit 13 connected to the output of the function switch circuit 12. In FIG. 3, the logic circuit 13 comprises latch circuits 101–104 of R-S flip-flops and diodes 105–113. An output terminal 94 of a function switch 96 of the tape recorder and an output terminal 95 of a function switch 97 of the record player are connected to inverted set terminals of the flip-flops 104 and 101, respectively, which produce function control output signals H and E, respectively, from their Q-terminals, which signals are applied to the selection circuits 17 and 18 to select the functions. Numerals 98 and 99 denote a tuner function switch and an auxiliary function switch, respectively, which produce selection signals F and G, respectively.

Figure 4:
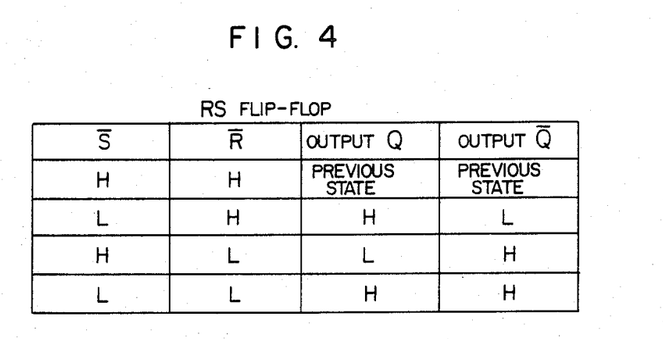
FIG. 4 shows a chart used to explain the operation of FIG. 3.

FIG. 4 illustrates a logic performed by the R-S flip-flops 101–104. The function of the above circuits may be performed by a microcomputer. When the microcomputer is used as the circuit 13 a key entry is provided to enter key inputs in response to a scan signal from the microcomputer and the output of the function switch 12 is coupled to the key entry.

In this manner, the function circuit of the control device can be controlled from the record player and it is no longer necessary for an operator to go to the control device site to operate the function switch. For the tape recorder, the function circuit can also be controlled to select the output signal of the tape recorder by opening the play switch 42a so that the transistors 82 and 83 conduct to render the output at the terminal 94 low level.

Figure 5:
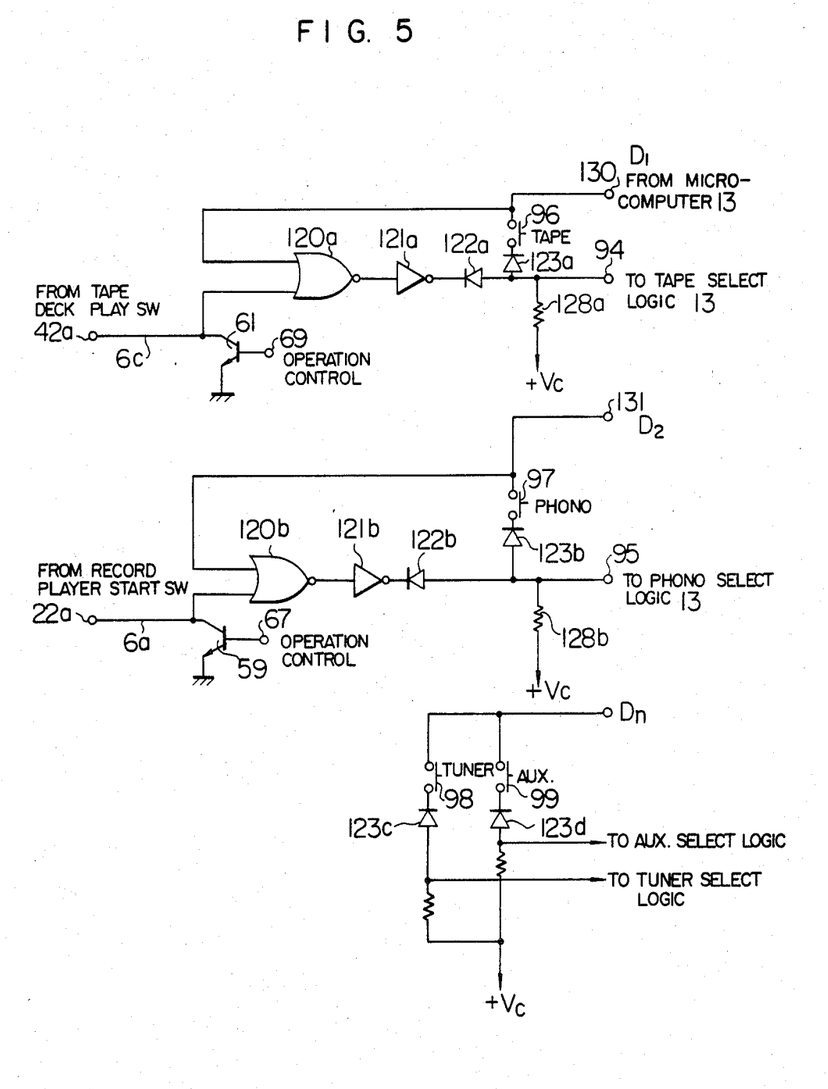
FIG. 5 shows a circuit diagram of a major portion of the function circuit in accordance with another embodiment of the present invention.

FIG. 5 shows another embodiment of the function specification circuit of the present invention. Only the control device is shown therein. The device of FIG. 5 is adapted to use as a microcomputer controlled circuit. The tape recorder, the record player and the associated stop and cut control circuits are identical to those of the embodiment shown in FIG. 2 and hence they are omitted in the drawing. The like elements to those of FIG. 2 are denoted by like numerals and they are not explained here. The microcomputer is provided in the control unit in which the function selection circuit is usually mounted as shown by the circuit 13 in FIG. 1. It carries out a multiple of functions to simplify the logic circuit of the system. Numeral 120a denotes a NOR circuit having one input terminal thereof connected to a collector of a switching transistor 61 and the other input terminal connected to a terminal 130 at which a scan signal $D_1$ from the microcomputer 13 is applied. An output terminal of the NOR circuit 120a is connected to an input terminal of a NOT circuit 121a, an output terminal of which is connected to a cathode of a diode 122a. An anode of the diode 122a is connected to a terminal 94 which is connected to an input terminal of the microcomputer 13, and further connected to a power supply +Vc through a resistor 128a and to an anode of a diode 123a. A tape function switch 96 for selecting the tape recorder is connected between a cathode of the diode 123a and the terminal 130. Numeral 120b denotes a second NOR circuit having a pair of input terminals connected to a collector of a transistor 59 and an input terminal 131 for a scan signal $D_2$ from the microcomputer 13, respectively. An output terminal of the NOR circuit 120b is connected to an input terminal of a second NOT circuit 121b. A cathode of the diode 122b is connected to an output terminal of the NOT circuit 121b and an anode thereof is connected to an output terminal 95. The anode of the diode 122b is further connected to the power supply +Vc through a resistor 128b and to an anode of a diode 123b, and a function switch 97 for selecting the record player is connected between a cathode of the diode 123b and the terminal 131. A tuner function switch 98 and an auxiliary function switch 99 receive the scan signal $D_n$ from the microcomputer 13 at the first terminals thereof and the second terminals thereof are connected to the power supply +Vc through diodes 123c and 123d, respectively, and the resistors. Function specification outputs are taken from the anodes of the diodes and applied to the microcomputer 13 to carry out the function logic. The diodes in FIG. 5 function to prevent malfunctions.

Figure 6:
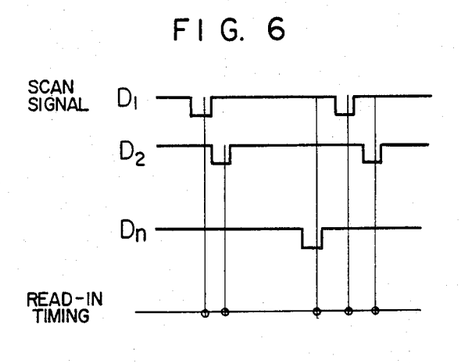
FIGS. 6 and 7 show charts used to explain the operation of a logic circuit comprising NOR gates and NOT gate shown in FIG. 5.
Figure 7:
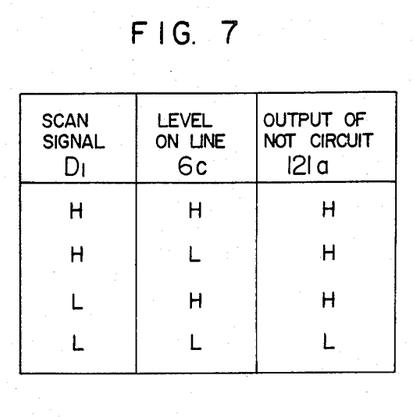

In the operation of the circuit of FIG. 5, the NOR circuits 120a and 120b each produces a high level (H) output at its output terminal when the pair of input terminals thereof are at low level (L), and produces a low level (L) output for other input conditions. The NOT circuits 121a and 121b are inverter circuits which invert the output of the NOR circuits 120a and 120b, respectively. When the output of the NOR circuit 120a or 120b is high, the NOT circuit 121a or 121b, respectively, produces a low level output to render the diode 122a or 122b to conduct. The control signal input terminals 130 and 131 are connected to the output terminals of the microcomputer 13 so that the scan signals $D_1$, $D_2$, ..., are applied thereto. The scan signals assume low level at a predetermined time interval. FIG. 6 shows a relation between the scan signal and the read-in of the scan signal. For example, when the tape recorder is operated and the line 6c assumes the low level, the NOR circuit 120a produces the high level output during the low level period of the scan signal supplied to the terminal 130, and this high level output is inverted in the NOT circuit 121a to produce the low level output, which renders the diode 122a to conduct so that the low level output is produced at the tape select terminal 94. As a result, the logic circuit 13 connected to the terminal 94 is operated to control the function selection circuits 16 and 17 to select the audio signal output of the tape recorder. FIG. 7 shows signals at various points described above. When the record player is operated, the NOR circuit 120b and the NOT circuit 121b operate similarly to control the function selection circuits.

When the function selection circuits are to be controlled by the control device, the switches 97 and 96 are opened so that the diodes 123a and 123b conduct in response to the low level of the scan signals supplied to the terminals 130 and 131 to produce the low level outputs at the output terminals 95 and 94. In this manner, the function selection circuits are controlled.

While the tape recorder and the record player have been primarily explained in the above embodiments, other external equipments such as VTR, television receiver or video disk player, which are connected to the control device of the FM radio receiver or stereophonic playback system can similarly control the function selection circuits of the control device from the external equipment.

While the units of the audio playback system have been described on the types which can be controlled by remote control for illustration, it will be readily understood that the present invention is applicable to the system having the control lines 6a–6f and no remote control function.

In accordance with the present invention, in the audio/video recording and reproducing system the function switch in the main unit such as a pre-main amplifier may be provided with the function of function selection for the operation start switch of the discrete units so that function selection can be performed in either of the main unit and the discrete units.

What is claimed is:

1. A function selection apparatus for selecting a function of an audio/video recording/reproducing system comprising:

a plurality of signal sources;
a control device including a selection circuit having a plurality of function select switches for selecting any one of the plurality of signal sources, said function select switches being disposed in respective signal transmission lines, a plurality of function switches provided corresponding to said plurality of signal sources, and function control means disposed between said plurality of function switches and said selection circuit responsive to the closure of one of said plurality of function switches for controlling one of said plurality of function selection switches corresponding to the closed function switch so as to select one of said signal sources corresponding to the closed function switch;
an external unit comprising reproducing means forming at least one of said plurality of signal sources, said external unit including therein a motive switch and a control circuit for controlling the operation of said reproducing means corresponding to said motive switch when said motive switch is closed;
first control means provided in said control device and responsive to the closure of said motive switch for controlling a corresponding one of said plurality of function switches to make it equivalently closed;
a control transmission line provided between said external unit and said control means for transmitting a signal indicative of the closure of said motive switch to said control means; and
second control means disposed between said plurality of function switches and said motive switch of the external unit and responsive to the closure of one of said function switches corresponding to said external unit to render the motive switch corresponding to the closed function switch equivalently in the closed state.

2. An apparatus according to claim 1, wherein said selection circuit includes a phono select switch disposed in a phono signal transmission path from a record player comprising the external unit serving as a signal source, said plurality of function switches includes a phono select switch with the arrangement being such that when the phono select switch is closed said function control means controls said phono select switch to select the phono signal source, said motive switch constitutes a start switch of said record player, said control circuit starts the operation of said record player when said start switch is closed, and said control means is responsive to the closure of said start switch to make said phone select switch equivalently closed.

3. An apparatus according to claim 1, wherein said plurality of function switches includes a tape select switch, said motive switch constitutes a play switch for a tape deck as an external unit, and said second control means is responsive to the closure of said tape select switch to render said play switch equivalently in the closed state.

4. An apparatus according to claim 1, wherein said second control means is provided within said control means and is connected to said motive switch through said control transmission line.

5. An apparatus according to claim 1, 2, 3 or 4, wherein a selected one of said plurality of function switches allows supply of a selection instruction signal to said selection circuit in response to the closure thereof or the motive switch.

6. An apparatus according to claim 1, wherein said second control means includes a control signal translation circuit having electronic switches connected in parallel with said motive switches, respectively; and a microcomputer or logic circuit responsive to the closure of one of said function switches for activating a corresponding one of said electronic switches of the control signal translation circuit to thereby render a corresponding one of said motive switches equivalently in the closed state.

7. An apparatus according to claim 6, wherein said electronic switch includes a transistor.

* * * * *